United States Patent [19]

Tran

[11] Patent Number: 5,392,276
[45] Date of Patent: Feb. 21, 1995

[54] METHOD FOR LINKING A PARTY WITHIN A FULL DUPLEX (DUAL CHANNEL) TDM NETWORK WITH A PARTY EXTERNAL TO THE NETWORK

[75] Inventor: Long Tran, Milpitas, Calif.

[73] Assignee: First Pacific Networks, Inc., San Jose, Calif.

[21] Appl. No.: 207,320

[22] Filed: Mar. 7, 1994

[51] Int. Cl.⁶ .................. H04B 1/56; H04B 7/212; H04L 5/14

[52] U.S. Cl. .................. 370/29; 370/85.3; 370/95.3

[58] Field of Search ............ 370/24.29, 58.1, 60, 370/66, 67, 68.1, 77, 85.2, 85.3, 85.7, 85.9, 85.13, 94.1, 94.2, 95.1, 95.3, 110.1, 110.2; 379/58, 63; 455/5.1, 53.1, 54.1, 54.2, 55.1

[56] References Cited

U.S. PATENT DOCUMENTS

| | | | |
|---|---|---|---|
| 4,757,460 | 7/1988 | Bione et al. | 370/85.3 |
| 5,084,903 | 1/1992 | McNamara et al. | 370/24 |
| 5,231,635 | 7/1993 | Travers et al. | 370/95.3 |
| 5,239,545 | 8/1993 | Buchholz | 370/95.3 |
| 5,272,700 | 12/1993 | Hansen et al. | 370/85.3 |
| 5,307,348 | 4/1994 | Buchholz et al. | 370/95.3 |

*Primary Examiner*—Alpus H. Hsu
*Attorney, Agent, or Firm*—Townsend and Townsend Khourie and Crew

[57] ABSTRACT

In a digital communications system with a time-division multiplexed medium having a transmit r.f. channel and a receive r.f. channel on an internal network having a head end multiplexer and interface for external connection of calls, timeslots are allocated to maximize time slot usage between internal calls and external calls by dynamically differentiating between internal call types and external call types, or calls between nodes within the internal network between an internal node on the internal network and an external node connected through a trunk, and, based on differentiation for the external call types, claiming a free timeslot for the internal node on the transmit r.f. channel and using the corresponding timeslot on the receive r.f. channel to establish communication between the internal node and the external node.

5 Claims, 3 Drawing Sheets

METHOD FOR LINKING A PARTY WITHIN A FULL DUPLEX (DUAL CHANNEL) TDM NETWORK WITH A PARTY EXTERNAL TO THE NETWORK

BACKGROUND OF THE INVENTION

This invention relates to digital communication networks and more specifically to a network interface unit of the type supplied by First Pacific Networks, Inc. of Sunnyvale, Calif. for control of a digital voice telephone network. In particular, the invention relates to communication link management between calls within a controlled network which allocates calls by time division multiplexing of time slots and calls coupled to the network through the network interface unit through a trunk external to the network.

This invention represents an improvement over the voice telephone link described in U.S. patent application Ser. No. 07/345,490 filed Apr. 28, 1989, (published PCT Application PCT/US89/01806), now abandoned, the content of which is incorporated herein by reference.

In the past, a network head end card multiplexer (NHC MUX) has been provided between an external trunk and an internal network. The internal network has operated according to a proprietary protocol in which a wideband medium is used with two channels, an upstream or transmit channel and a downstream or receive channel. Each node within the network is connected to both the transmit channel and the receive channel. Communication is wideband and frame based, each frame containing a plurality of time slots to be reserved or allocated to packets containing data representing calls, whether audio, data or video. In the past, the head end has automatically reflected all information on the transmit channel to a corresponding timeslot of the receive channel. Moreover, each time slot (set) has been permanently paired with another time slot. This pairing enables full duplex communication during any two-way conversation on the internal network. At the beginning of each call, there is an acquisition period. The acquisition period is a time during which a time slot pair is claimed for a two-way full duplex conversation. In the past, a transmitting party (internal caller node) "occupying" a transmit time slot listens on the receive channel during the receive time slot.

However, as is typically the case, when the call of an external party that is outside the network (external caller) is passed through the MUX (a bridging call), the call data was multiplexed into the internal network as if it were an internal call. Since the bridging call occupies only a single channel, and since the receive time slot is not sent back to the external caller on the receive channel, one-half of the time slots among the paired time slots is unused in this situation. What is needed is a mechanism for better utilizing the available resources in an environment where a party connected internal to a network is communicating with a party external to the network.

SUMMARY OF THE INVENTION

According to the invention, a distributed communications network having a network head end element for multiplexing between an internal network and a trunk and wherein the communications protocol internal to the internal network is a form of time division multiplexing on a transmit r.f. channel and on a receive r.f. channel, a method for allocating time slots of frames for full duplex time division multiplex communication includes dynamically differentiating between those calls which are between nodes within the internal network from those calls which are between nodes on the internal network and a node connected through a trunk. Incoming and outgoing calls are also distinguished. The differentiation includes designating in a control packet the type of calling party (whether trunk or internal), and in response to a call request, initiating an event generating a random time slot number, searching through a table of busy and free time slots (where transmit and receive channels are typically but not necessarily allocated the same time slot on each channel of the frame) starting with the random number until a time slot is found which is free, causing a claim indicator to be transmitted during the free time slot, initiating a call request task to communicate to the called party including a send packet containing the caller ID, the claimed time slot number and the calling party type, which in turn generates a claim response task, thereupon if the calling or called party is coupled to the interface from the trunk, causing the corresponding time slots on the receive r.f. channel to be used for transmitting information from the trunk-connected external node to the internal node on the network so that the trunk transmits within the multiplexer on the claimed time slot of the upstream channel backplane and receives in the corresponding time slot on the downstream channel backplane, whereas the call-connected internal node transfers packets in the same time slot on the transmit r.f portion of the internal network and listens on the same time slot in the receive portion of the internal r.f network; otherwise if neither party is identified to be a trunk caller, the called party is caused to claim a further free timeslot on the transmit r.f. channel and use the corresponding timeslot on the receive r.f. channel.

The invention will be better understood by reference to the following detailed description in connection with the accompanying drawings.

DESCRIPTION OF SPECIFIC EMBODIMENTS

Figure 1:
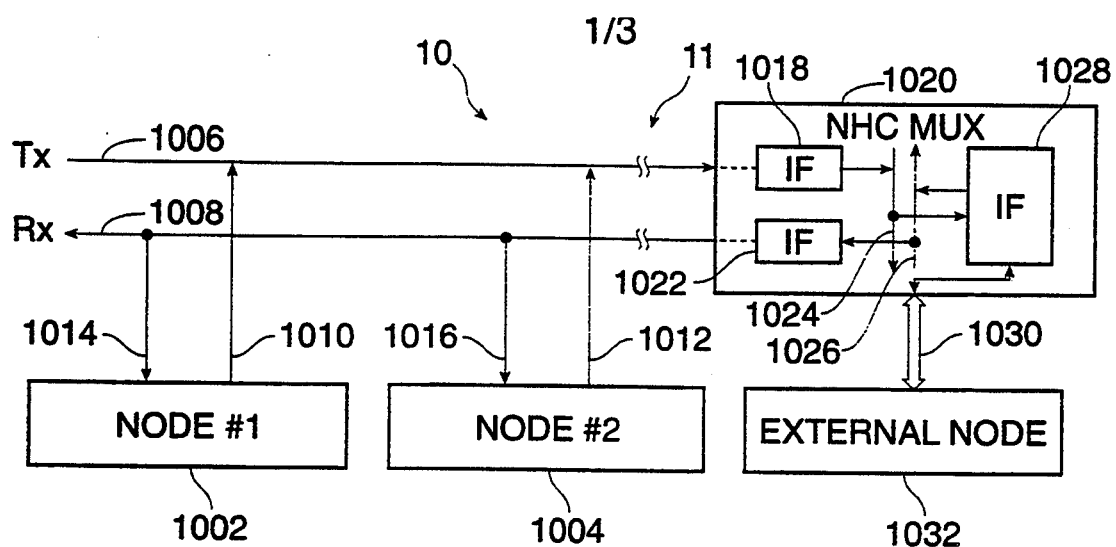
FIG. 1 is a block diagram of a system operative according to the invention.

FIG. 1 is a block diagram of a system 10 with a network 11 according to the invention having a network head end multiplexer (NHC MUX) 1020 coupled to an r.f transmit or upstream channel 1006 and an r.f receive or downstream channel 1008 forming the media of a so-called internal network, since it is isolated from other media and networks. This internal network is a digital network using packet communication and designed to support voice, data and video communication within the network and beyond, to the extent such modes are supported externally. Each node 1002, 1004 provides the intelligent interface to both the respective transmit channel 1006 and receive channel 1008 via feeds 1010, 1012 and returns 1014, 1016. The transmit channel 1006 feeds a receive interface 1018 of the NHC MUX 1020 and the receive channel 1008 is fed by a transmit interface 1022 of the NHC MUX 1020.

Within the NHC MUX 1020 is an upstream backplane 1024 and a downstream backplane 1026 over which information is passed internally among the subsystems of the NHC MUX 1020. The upstream backplane 1024 and the downstream backplane 1026 are coupled to an internetwork interface 1028, which in turn is coupled to receive and send information via a trunk 1030, which in turn communicates with external nodes, such as external node 1032 having calls for or intended to receive calls from nodes internal to the network 11.

Figure 2A:
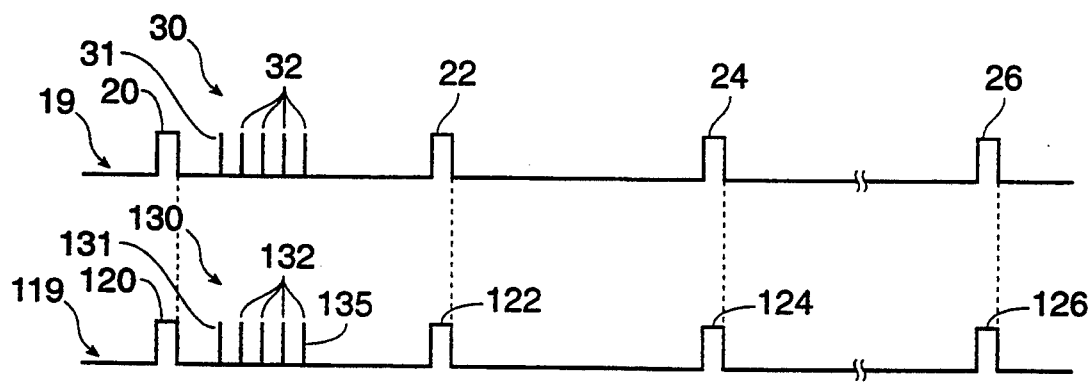
FIG. 2A is a representation of a timing diagram of an apparatus according to the invention for an internal-external call.

Referring to FIG. 2A, the timing of timeslots and a call acquisition procedure are illustrated for an internal-to-external call. On the transmit r.f. channel, represented by timing diagram 19, timing marks 20, 22, 24, 26 mark the beginning of each timeslot for each frame. Corresponding timeslot timing marks 120, 122, 124, 126 mark the beginning of each timeslot for each frame in the timing diagram 119 of the receive r.f. channel. Typically, the timeslots are simultaneous, and the NHC MUX 1020 would merely "reflect" information received from a first node back on the receive channel. However, for internal-to-external calls according to the invention, signalling packet 31 in timeslot 30 from node 1, which would include a claim indicator, and data packets 32, are passed to the NHC MUX 1020 (FIG. 1) where they are processed and a portion passed to the external node 1032. According to the invention, for internal-to-external call types, the receive channel is used only for data (signal packet 131 and data packets 132) in timeslot 130 directed to node 1 from the external node 1032, the NHC MUX 1020 acting on behalf of the external node 1032 to simulate another node on the network to include such elements as a control packet 135. According to the invention, the timeslot 130 corresponding to the claimed timeslot 30 of node 1 is used for communication to node 1. In this configuration, node 1 listens for data from the external node and not for its own return data from the receive channel.

Figure 2B:
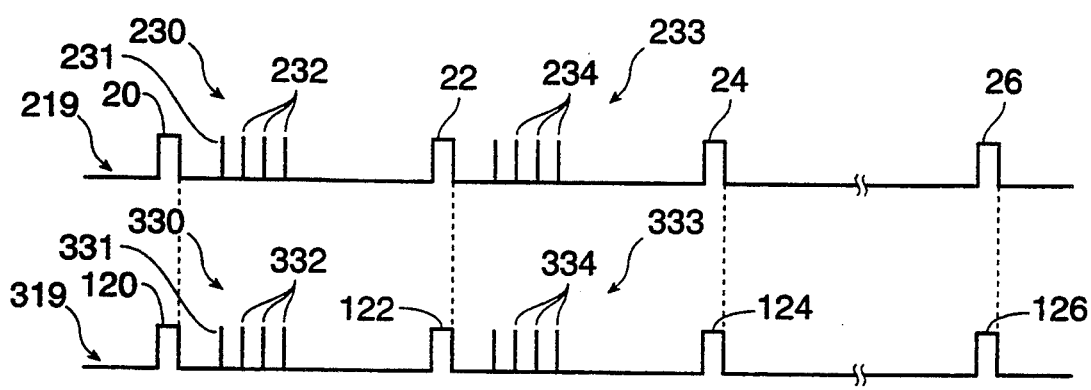
FIG. 2B is a representation of a timing diagram of an apparatus according to the invention for an internal-internal call.

In FIG. 2B, the known use of grouping of timeslots in a call acquisition procedure for internal-to-internal calls is illustrated by the timing diagrams 219 and 319 for the transmit channel and receive channel, respectively. On the transmit r.f. channel, with timing marks 20, 22, 24, 26 marking the beginning of each timeslot 230, 233, etc., for each frame and corresponding timeslot timing marks 120, 122, 124, 126 marking the beginning of each timeslot 330, 333, etc., for each frame on the receive r.f. channel, the timeslots are simultaneous and the NHC MUX always reflects information received from a first node on the transmit channel back on the receive channel. For internal-to-internal calls according to the invention, signaling packet 231, which would include a claim indicator, and data packets 232 (from for example node 1), are passed to the NHC MUX 1020 (FIG. 1) where they are processed and simply reflected on the corresponding signaling time slot 320 of the receive channel. According to the invention, for these call types, another timeslot 233 (333) is claimed on behalf of the target node so that the transmit channel and the receive channel have two timeslot sets 230, 330; and 233,333 paired. According to the invention, the signalling packet 231 of claimed timeslot 230 of node I is used for communication to node 2: The signalling packet 331 and data packets 332 are identical to signalling packet 231 and data packets 232. In this configuration, node 1 listens on the receive channel for data packets 334 from the target internal node (for example node 2 transmitting data packets 234) in the paired timeslot 233 (333) and for its own return data 330 on the receive channel in its own claimed timeslot 230.

Figure 3A:
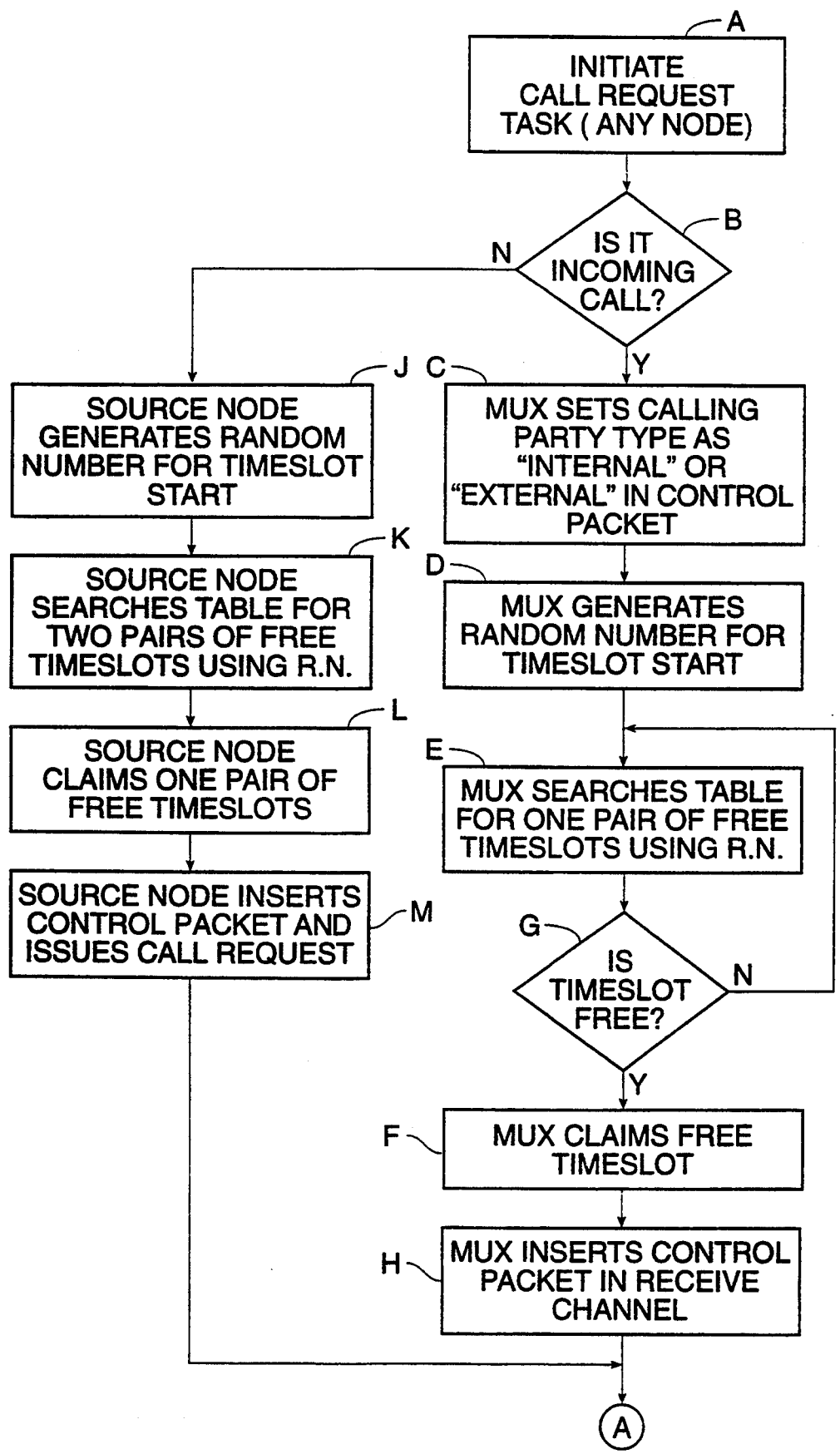
FIG. 3A and FIG. 3B are a flow chart of a method in accordance with the invention.
Figure 3B:
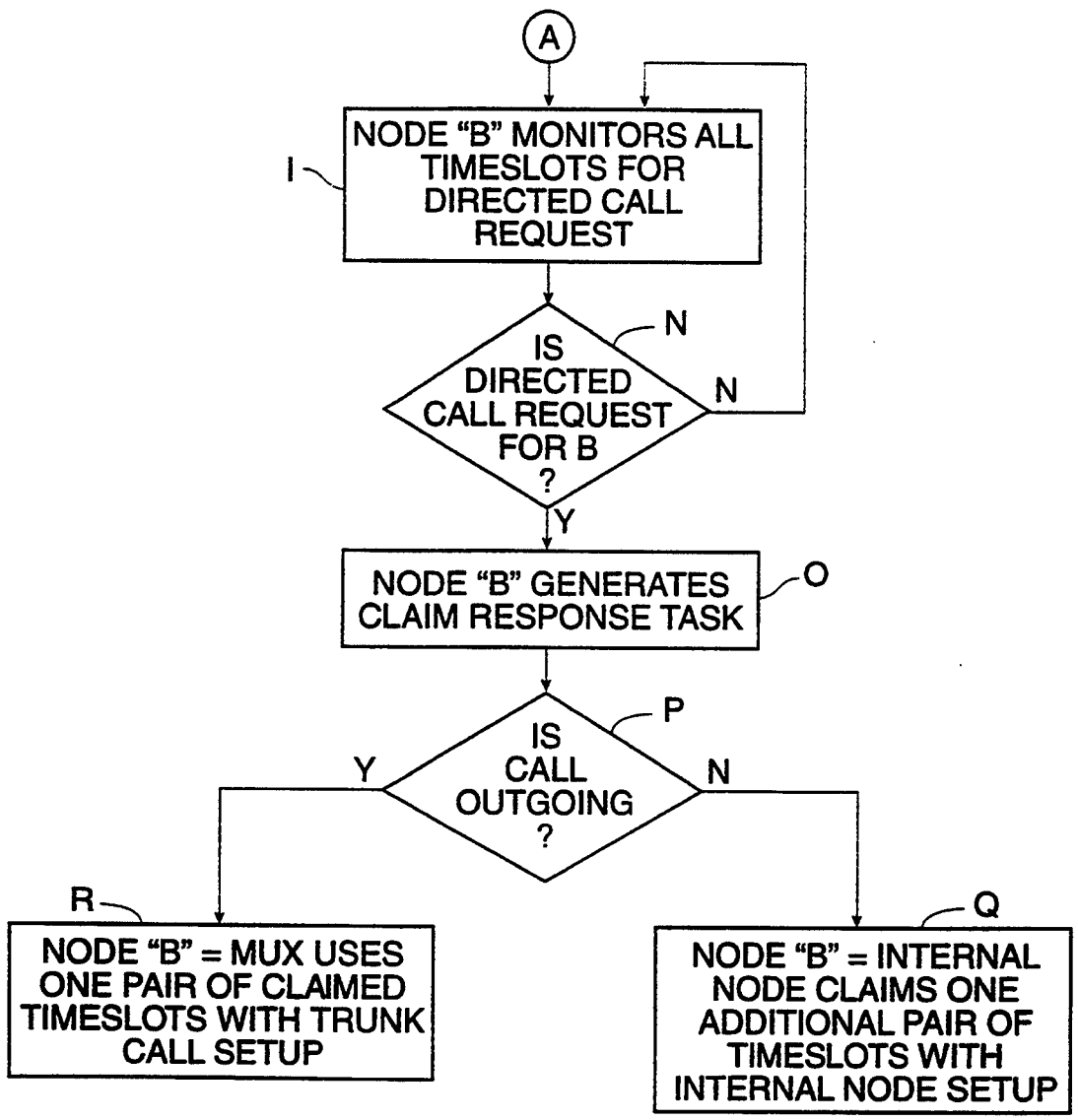

FIG. 3 and FIG. 3B are a flow chart of a method for claiming timeslots in accordance with the invention. Any node in the network of the invention may initiate a call request task, whether an outgoing call or an incoming call, in which case the NHC MUX 1020 (FIG. 1) serves as the agent of the incoming call from the external node 1032 (Step A). The NHC MUX 1020 can determine whether the call is incoming or outgoing (Step B). If the call originates on the internal network, the source node knows it is an outgoing call. If incoming, the MUX 1020 sets the calling party type as "internal" or "external" (Step C) and generates a random number to serve as a seed for the open timeslot search start (Step D). A timeslot table (not shown) is maintained at the MUX 1020 which is used for allocating the timeslots of the upstream channel and the downstream channel. This timeslot table is searched for a free timeslot, beginning at the timeslot designated by the random number (Step E). When a free timeslot is found, the MUX 1020 claims it on behalf of the incoming (external) call (Step F); otherwise it continues the search (Step G). Once a timeslot has been claimed, the MUX 1020 sends a control packet with ID, party type, timeslot numbers for both transmit and receive channels (one number may be sufficient if there is automatic correspondence), and it issues a call request (Step H). During this time all nodes monitor all control packets on the receive r.f. channel for packets directed to them (Step I), as hereinafter explained.

If the call is not an incoming call, i.e., it is an outgoing call directed to an external node (Step B), then the source node knows to generate the random number to serve as a seed for the open timeslot search start (Step J). The timeslot table (not shown) maintained at the MUX 1020 which is used for allocating the timeslots is searched for two (pairs) of free timeslots, beginning at the timeslot designated by the random number (Step K). When the free timeslots are found, the source node claims one pair of them (there being a corresponding timeslot on the receive channel automatically allocated by this claim (Step L). Once timeslots have been claimed, the source node sends control packets with ID, party type, timeslot numbers and issues the call request, and it issues a call request (Step M).

While all nodes are monitoring the receive channel (Step I), the nodes test for call requests directed to themselves (Step N). If a call request is intercepted by a node (herein designated Node "B") on the network, the node (Node "B") generates a claim response task (Step 0) and if it is not an outgoing call (Step P) claims the additional free timeslot (pair), and an internal call is set up (Step Q). If the call is an outgoing call (Step P), the MUX, acting as Node "B" on behalf of the external node, intercepts the claim request and sets up the trunk call using only one pair of timeslots (Step R). In this mode, on the transmit channel, information from the source node is transmitted. On the receive channel, information from the external node is transmitted so the source node listens in its claimed timeslot on the receive channel. Hence, according to the invention, the effective throughput of the internal network is doubled for calls between internal nodes and external nodes.

Although the foregoing invention has been described in some detail by way of illustration and example, for purposes of clarity of understanding, it will be obvious that certain changes and modifications may be practiced within the scope of the appended claims.

What is claimed is:

1. In a digital communications system with an internal network having a head end multiplexer and interface for external connection of calls through a trunk, a method for allocating timeslots on a time-division multiplexed medium having a transmit r.f. channel and a receive r.f. channel, said method comprising the steps of:

dynamically differentiating between first call types and second call types, said first call types being calls between nodes within the internal network, and said second call types being calls between an internal node on the internal network and an external node connected through the trunk; and, based on said differentiating for second call types;

a) for outgoing calls:

initiating, at an internal node, a call request to claim a first timeslot position on the transmit r.f. channel and to use a corresponding second timeslot position on the receive r.f. channel, wherein said first timeslot position and said second timeslot constitute a single timeslot pair are free for use;

requesting, via the internal node, a call, via the first free timeslot position on the transmit r.f. channel, to cause said head end multiplexer, on behalf of the outgoing call, to use said corresponding second free timeslot position on said receive r.f. channel, to establish communication from the external node via said receive r.f. channel to said internal node and from said internal node via said transmit r.f. channel to said external node;

b) while for incoming calls:

initiating, at said head end multiplexer, the call request to claim the first free time slot position on the transmit r.f. channel and to use the corresponding second free timeslot position on the receive r.f. channel; and requesting, via said head end multiplexer, a call via the first free time slot position on the receive r.f. channel to cause a destination node to initiate a claim response task such that any calls between the external node and the internal node occupy only a single timeslot pair.

2. The method according to claim 1 wherein said differentiating step includes designating in a control packet said call type, and in response to said call request initiation, generating a random time slot number, searching through a table of busy timeslots and free timeslots of the transmit r.f. channel starting with the random number until a timeslot position is found which is free, and causing a claim indicator to be transmitted on the transmit r.f. channel during a first free timeslot.

3. The method according to claim 2 wherein said requesting step for outgoing calls includes:

initiating, at the internal node as a calling party, a call request task directed via the transmit r.f. channel to the head end multiplexer in order to communicate to the external node, said call request task including a send packet containing caller ID, claimed time slot numbers and the call type of the calling party, which in turn causes, at said head end multiplexer, generation of a claim response task to cause the second timeslot position corresponding to the claimed first timeslot position to be used by the called party; otherwise if the called party is identified as not to be connected via a trunk call:

claiming, at the internal node as calling party a third timeslot position, the third timeslot position being paired with a fourth timeslot position on the receive r.f. channel, said third timeslot position being free on the transmit r.f. channel; and causing the fourth timeslot position on the receive r.f. channel to be used as a reflection of content of the third timeslot position, the first timeslot position and the third timeslot position not being constrained to be automatically shared with a single node.

4. The method according to claim 3 wherein said head end multiplexer has an upstream channel backplane and an downstream channel backplane, and wherein the call request task further includes the steps of:

prompting said head end multiplexer so that the external call transmits in the first timeslot position via the upstream channel backplane and receives in the corresponding second timeslot position via the downstream channel backplane, and wherein the internal node transfers packets in the first timeslot position on the transmit r.f. channel of the internal network and listens on the corresponding second timeslot position for the external call on the receive r.f. channel of the internal network.

5. The method according to claim 1, further including the steps of, based on differentiation for first call types, causing the calling party to claim a third timeslot position on the transmit r.f. channel, the third timeslot position being not being constrained to be automatically shared with a single node.

* * * * *